(12) United States Patent
Ravagnani et al.

(10) Patent No.: US 8,985,998 B2
(45) Date of Patent: Mar. 24, 2015

(54) INJECTION SYSTEM HAVING SKIRT WALLS FORMING AN ANNULAR SEAL WALLS

(75) Inventors: Andrea Ravagnani, Imola (IT); Giovanni Allegri, Fusignano (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 239 days.

(21) Appl. No.: 13/703,454

(22) PCT Filed: Jun. 16, 2011

(86) PCT No.: PCT/IB2011/152614
§ 371 (c)(1),
(2), (4) Date: Dec. 23, 2013

(87) PCT Pub. No.: WO2011/161590
PCT Pub. Date: Dec. 29, 2011

(65) Prior Publication Data
US 2014/0037782 A1    Feb. 6, 2014

(30) Foreign Application Priority Data
Jun. 24, 2010  (IT) .............................. MO2010A0188

(51) Int. Cl.
*B29C 45/23*   (2006.01)
*B29C 45/20*   (2006.01)
*B29C 45/28*   (2006.01)

(52) U.S. Cl.
CPC ............... *B29C 45/20* (2013.01); *B29C 45/281* (2013.01)

USPC ................... 425/564; 264/328.8; 264/328.15; 425/572

(58) Field of Classification Search
USPC .......................... 425/549, 562, 563, 564, 572; 264/328.15, 328.8
See application file for complete search history.

(56) References Cited

U.S. PATENT DOCUMENTS

| | | | |
|---|---|---|---|
| 4,682,945 A | | 7/1987 | Schad |
| 5,022,846 A | * | 6/1991 | Schmidt ........................ 425/564 |
| 5,894,025 A | * | 4/1999 | Lee et al. ...................... 425/562 |
| 6,599,116 B2 | * | 7/2003 | Lee et al. ...................... 425/564 |
| 7,467,941 B2 | * | 12/2008 | Jenko ............................ 425/564 |

FOREIGN PATENT DOCUMENTS

| | | |
|---|---|---|
| JP | 2008213154 A | 9/2008 |
| WO | 0178962 A1 | 10/2001 |
| WO | 03064135 A1 | 8/2003 |
| WO | 2008131517 A1 | 11/2008 |
| WO | 2009158091 A1 | 12/2009 |

* cited by examiner

*Primary Examiner* — Tim Heitbrink
(74) *Attorney, Agent, or Firm* — Laubscher, Spendlove & Laubscher, P.C.

(57) ABSTRACT

An injection system, in an apparatus for injection-molding plastics, comprises a manifold plate (2) having an injection nozzle (3) closed by a valve stem (7) commanded by a dual-effect pneumatic linear actuator (8, 9) wherein a piston cylinder (8) is compressed between a back plate (10) and a hot runner manifold (5). The piston cylinder bounds an annular gap into which the compressed air that drives the actuator can flow.

13 Claims, 4 Drawing Sheets

INJECTION SYSTEM HAVING SKIRT WALLS FORMING AN ANNULAR SEAL WALLS

This application is a §371 National Stage Entry of PCT International Application No. PCT/IB2011/052614 filed Jun. 16, 2011. PCT/IB2011/052614 claims priority to IT Application No. MO2010A000188 filed Jun. 24, 2010. The entire contents of these applications are incorporated herein by reference.

BACKGROUND OF THE INVENTION

The invention relates to an injection system, in particular in apparatuses for injection-moulding of plastics.

In particular, the invention relates to an injection system according to the preamble of the first claim.

An injection system of this type is already known, for example from the patent publications WO 01/78962, WO 03/064135 and WO 2008/131517.

Known systems for injecting plastics in the field of apparatuses for moulding are improvable in various aspects.

In the first place it is desirable to reduce the undesired effects caused by heat expansion, which is mainly caused by the heat in the runner manifold. These undesired effects may comprise dimensional variations to parts of the system such as to cause, for example, leaks of the operating fluid (for example air) of the valve stem actuator, imprecisions in the operation of the valve of the nozzle, incorrect balancing of the various pistons (mounted in series on the plates or slabs of the injection system), imbalance in the loads supported by the various elements (nozzles, cylinders, bushes, etc) mounted serially on the plates of the system, etc.

It is further desirable to maintain a compressing load that is not excessive but is nevertheless able to provide the correct clamping force for clamping the hot runner manifold between the manifold plate and the back plate, to prevent the escape of the injected plastics, whatever the operating condition (in particular at any temperature of the hot runner), and further to ensure correct preloading of the elements interposed between the hot runner manifold and the back plate (for example the piston cylinders of the actuators) and of the elements interposed between the hot runner manifold and the manifold plate (for example the injection nozzles).

Another improvable aspect is to increase the duration of correct operation of the valve stem actuator. It is noted that a drawback in this respect of known injection systems consists in that the seal means (seal) of the valve actuator can easily get damaged, for example owing to the sliding on a hot wall and/or the deformation (stretching) suffered by the seal whilst it is inserted into the seat thereof.

SUMMARY OF THE INVENTION

An object of the invention is to provide an injection system that is able to improve one or more of the aspects of the prior art indicated above.

An advantage is ensuring that there are no leaks of the operating fluid of the valve actuator of the injection nozzle, in particular by correct coupling between the piston cylinder and the back plate in any operating condition of the injection system, in particular at any temperature.

An advantage is to make an injection system available that is able to recover possible clearances, or loosening of the compression loads, due to heat expansion, in particular for ensuring the correct coupling and/or the correct compression load of elements interposed between the back plate and the hot runner manifold.

An advantage is to increase the operating life of the injection system, in particular by reducing the thermal stress suffered by components of the system, such as, for example the seal arrangement of the piston of the linear actuator driving the valve of the injection nozzle.

Such objects and advantages, and still others are achieved by the injection system according to one or more of the claims set out below.

BRIEF DESCRIPTION OF THE DRAWINGS

The invention can be better understood and implemented with reference to the attached drawings that illustrate an embodiment by way of non-limiting example.

DETAILED DESCRIPTION

Figure 1:
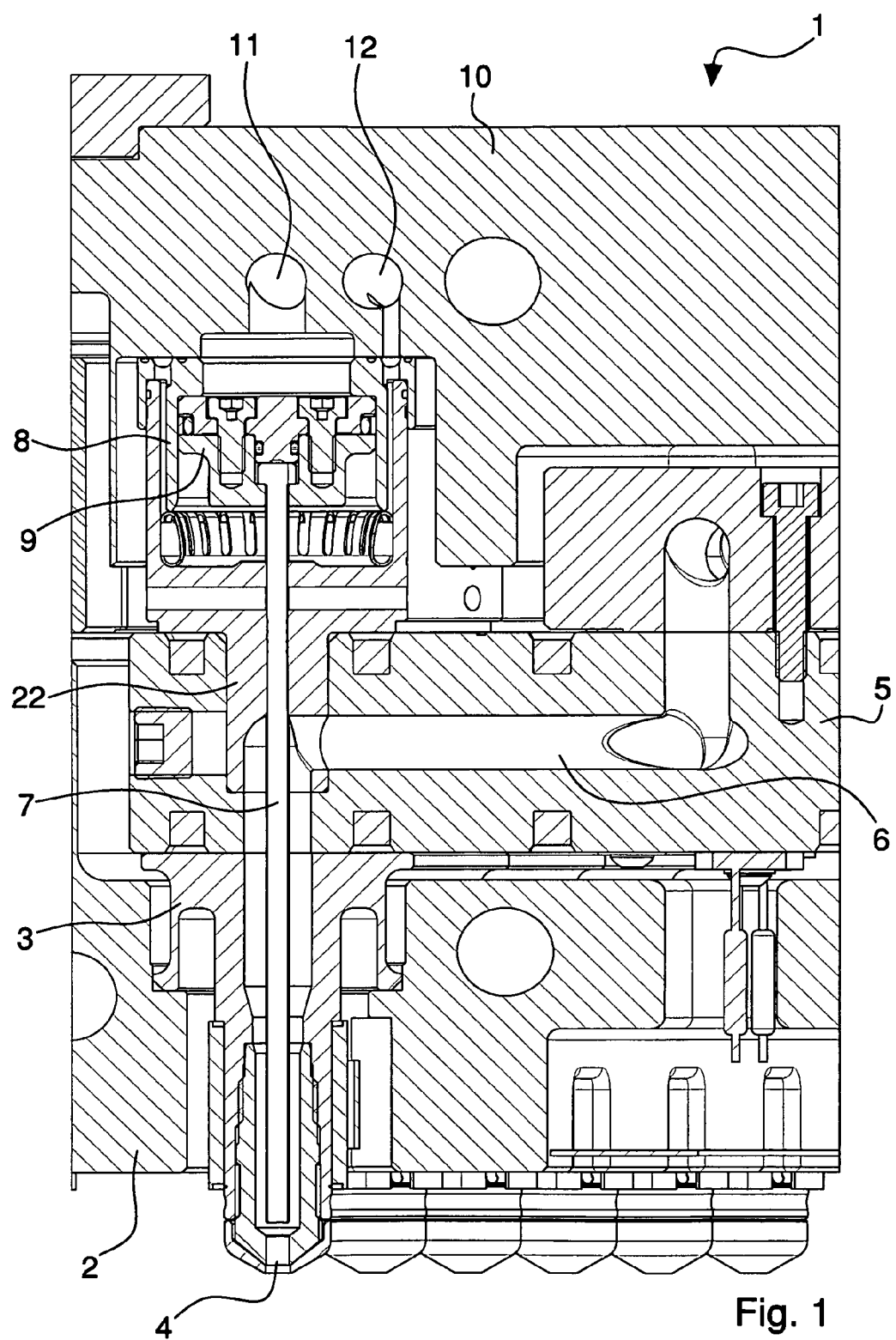
FIG. 1 is a section along a vertical plane of a part of the injection system.

With reference to the aforesaid figures, an injection system for injecting plastics in a mould cavity has been indicated overall with 1. The injection system 1 is part of an apparatus for injection-moulding plastics.

The injection system 1 comprises a manifold plate or slab 2 having a nozzle 3, or a series of nozzles, each of which is configured for injecting a flow of molten material into the mould cavity. In the attached figures there is illustrated for the sake of simplicity a single injection nozzle. The injection nozzle 3 has an outlet 4 for the flow of molten material directed to the mould cavity.

The injection system 1 includes a hot runner manifold 5 configured for supplying the flow of molten material to the injection nozzle 3. Internally, the manifold 5 has channels 6 within which the flow of molten material flows. The manifold 5 is further provided with a controlled heating arrangement (of known type) to maintain the molten material at a desired temperature.

The injection nozzle 3 is compressed between the manifold 5 and the manifold plate 2, in particular in such a way that the compressing load contributes to forming a seal zone between the manifold 5 and the nozzle 3 to prevent leaks of plastics.

The injection system 1 comprises a valve stem 7 for controlling the flow of molten material through the injection nozzle 3. A (central) part of the valve stem 7 passes through the manifold 5, in particular a part of the valve stem 7 can be housed in a part of a passage channel 6 of the molten material. A first (proximal) end of the valve stem 7 operates on the outlet 4 of the injection nozzle 3 to close and open the nozzle. A second (distal) end of the valve stem (opposite the first end) is connected to an actuator for driving opening and closing.

The drive actuator may include a dual-effect linear actuator (for example pneumatic) having a piston cylinder 8 and a piston 9 that is slidable in a sealed manner within the piston cylinder 8 to open and close the valve stem 7. The second end of the valve stem 7 is integral with the piston with a coupling arrangement including one or more screw fixing elements that act on the stem 7 by interposing a central body inserted into a tubular wall of the piston within which an annular seal operates.

The injection system 1 comprises a back plate or slab 10 into which at least in part the various drive actuators can be inserted, one for each valve stem 7 operatively associated with a corresponding injection nozzle 4. For each actuator, the piston cylinder 8 can be compressed between the back plate 10 and the manifold 5, so that a compression load is transmitted between the back plate 10 and the manifold 5 through the piston cylinder 8. This compressing load can contribute to giving rise to one seal zone for the operating fluid (for example compressed air) of the actuator.

The dual-effect linear actuator will have at least two supply ports of the operating fluid, a stem-closing supply port 11 and a stem-opening supply port 12. The piston cylinder 8 can be, as in the example, integral with or integrated into a front surface 13 that defines, for example in collaboration with a further front surface (facing in contact with the front surface 13 of the piston cylinder 8) of the back plate 10, a first seal zone 14 that separates from one another the two supply ports 11 and 12. The front surface 13 of the piston cylinder 8 can further define, for example in collaboration with the further front surface of the back plate 10, a second seal zone 15 that separates one of the two supply ports, in particular the stem-opening supply port 12, from the exterior.

The first seal zone 14 and/or the second seal zone 15 can be provided, respectively, with a first seal and a second seal, each of which can be interposed between the front surface 13 of the piston cylinder 8 and the further front surface of the back plate 10.

Figure 2:
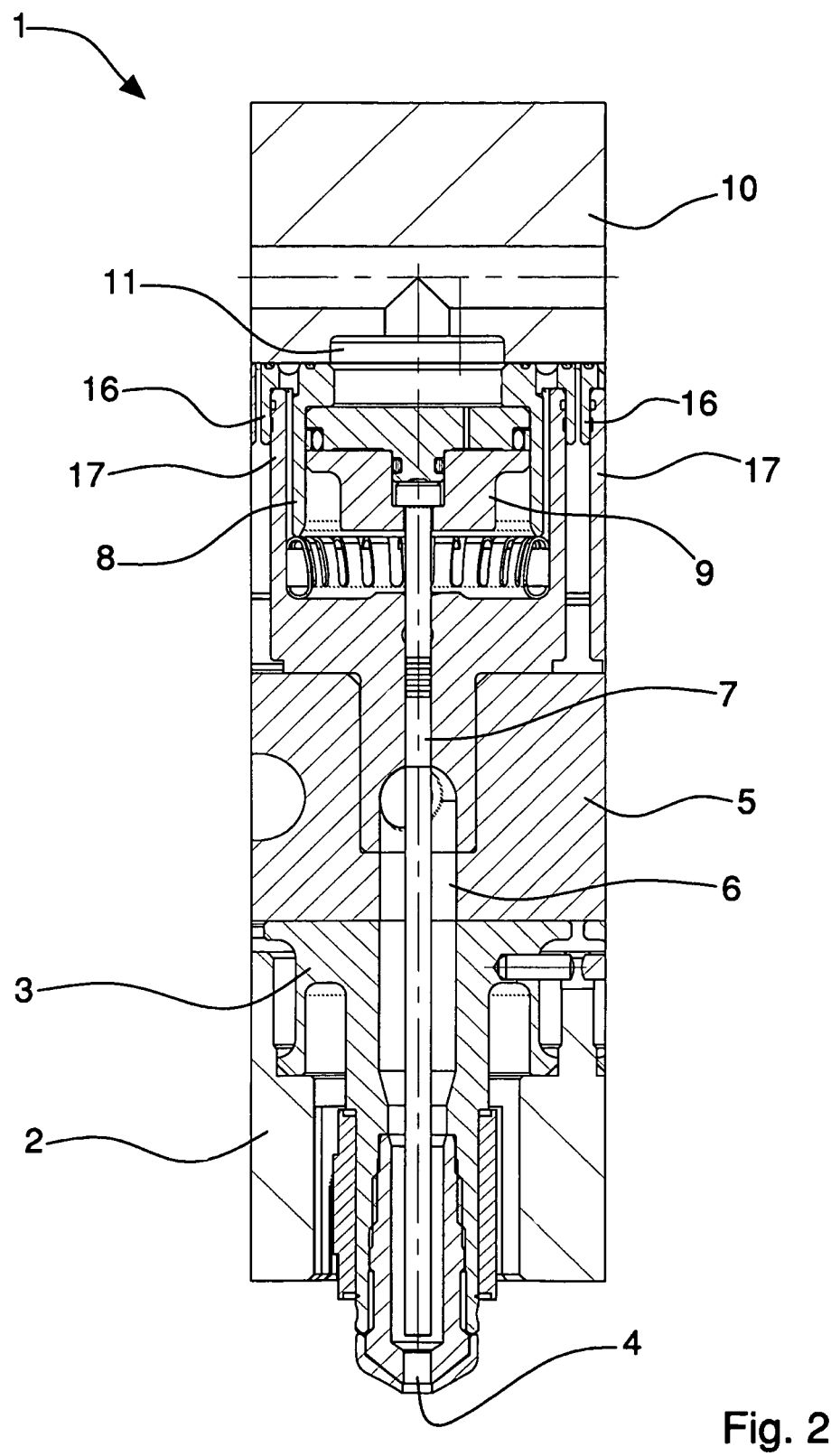
FIG. 2 is a section of the part of the injection system in FIG. 1 along a vertical plane perpendicular to the section plane of the FIG. 1.

The injection system 1 comprises a first (cylindrical) skirt wall 16 that is integral with or connected solidly to the piston cylinder, and a second (cylindrical) skirt wall 17 that is integral with or connected solidly to the manifold 5 (in FIG. 2 the skirt walls 16 and 17 of a valve unit adjacent- to the one illustrated are visible in part). The first and the second skirt wall 16 and 17 are coupled with one another with the possibility of mutual axial sliding along an annular seal zone 18 in a direction parallel to the valve stem 7 (or to the operational axis of the linear actuator). The seal zone could comprise one or more annular seals interposed to form a seal between the coupling surfaces.

The injection system 1 can further comprise, as in the specific example, a bottom wall 19 that closes an end of the second skirt wall 17. The bottom wall 19 may have an (axial) hole for the passage of the valve stem 7.

The injection system 1 may comprise, as in the specific example, a deformable body 20 arranged between the piston cylinder 8 and the bottom wall 19 to contribute, by virtue of the deformability thereof, to maintaining the coupling between the piston cylinder 8 and the back plate 10, (in particular to contribute to maintaining the coupling in contact between the front surface 13 and the further front surface of the back plate 10 at the seal zones 14 and 15 with an appropriate compressing load) and thus ensuring the transmission of the compressing load between the back plate 10 and the manifold 5.

The deformable body 20 may comprise, as in the specific example, at least one elastically deformable annular body arranged inside an operational chamber of the actuator. The annular body can have, as in the illustrated example, a C-shaped cross section. The annular body can be optionally provided, as in the example, with a plurality of elastically deformable arms between which there is defined a plurality of openings 21 that enable the operating fluid of the actuator (compressed air) to pass through the annular body (this can improve cooling of the annular body and thus of the piston cylinder 8 coupled in contact therewith).

The bottom wall 19 and the second skirt wall 17 can be integrated with one another to form a single body and, in particular, can be integrated, as in the example illustrated, in a bush 22 housed in a seat obtained in the manifold 5. The bush 22 in particular can be locked on the manifold 5. The bush 22 can further have an internal passage 23 for molten material. The valve stem 7 can traverse a hole inside the bush 22 and can be further coupled in a sealed manner (for example with a seal arrangement 24) with a hole surface. The bush 22 can have an internal discharge channel 25 that is transverse to the valve stem 7. The discharge channel 25 can cross the stem passage hole inside the bush 22 in an intersection zone that can be interposed between the passage 23 for molten material and the bottom wall 19 (in particular between the seal arrangement 24 and the bottom wall 19). The discharge channel 25 can be used, in particular, for draining powder or product waste material from the hot plastics.

The first skirt wall 16 can have, as in the example, an internal cylindrical surface that is slidably coupled in a fluid-tight manner with an external cylindrical surface of the second skirt wall 17.

At least one part, or the entire second skirt wall 17 can surround, as in the illustrated example, at least a part of, or the entire piston cylinder 8 (in particular the active cylinder part that receives in a slidably coupled manner the piston 9), forming an annular gap that can be, as in the example, in fluid communication with one of the two supply ports, in particular with the stem-opening port 12 as in the illustrated example.

It is possible to provide other embodiments in which at least one part of or the entire second skirt wall 17 and/or at least one part of or the entire first skirt wall 16 surround at least one part of, or the entire, active (cylindrical) tubular wall of the piston cylinder 8 (i.e. the active sealed coupling wall on which the piston 9 slides axially) forming the annular gap 26 that, as in the example, will be in fluid communication with a side of the piston 9 (for example the side on which the operating fluid of the actuator acts in closure). The annular gap 26 can be traversed by the operating fluid (at a relatively low temperature) thus promoting cooling of some parts of the system, such as, in particular, the piston cylinder 8 and the second skirt wall 17.

The deformable body 20 that, as has been seen, is arranged between the piston cylinder 8 and the manifold 5 to maintain the coupling between the piston cylinder 8 and the back plate 10, and thus ensure transmitting of the compressing load, can be interposed, as in the specific example, between the annular gap 26 and the piston 9 side that communicates with the annular gap 26 (the side on which the fluid acts in closure).

Figure 3:
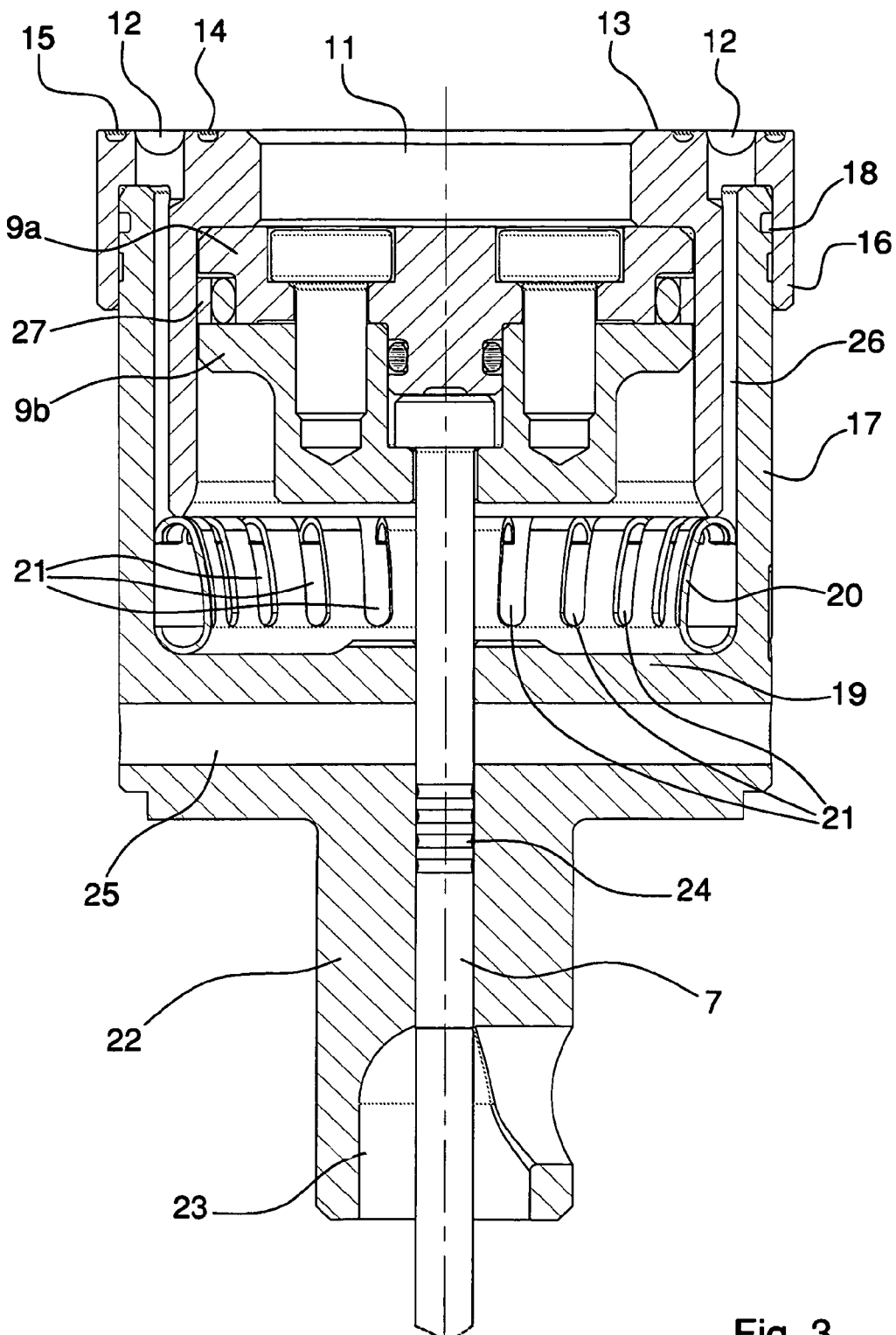
FIG. 3 is an enlarged detail of FIG. 1.
Figure 4:
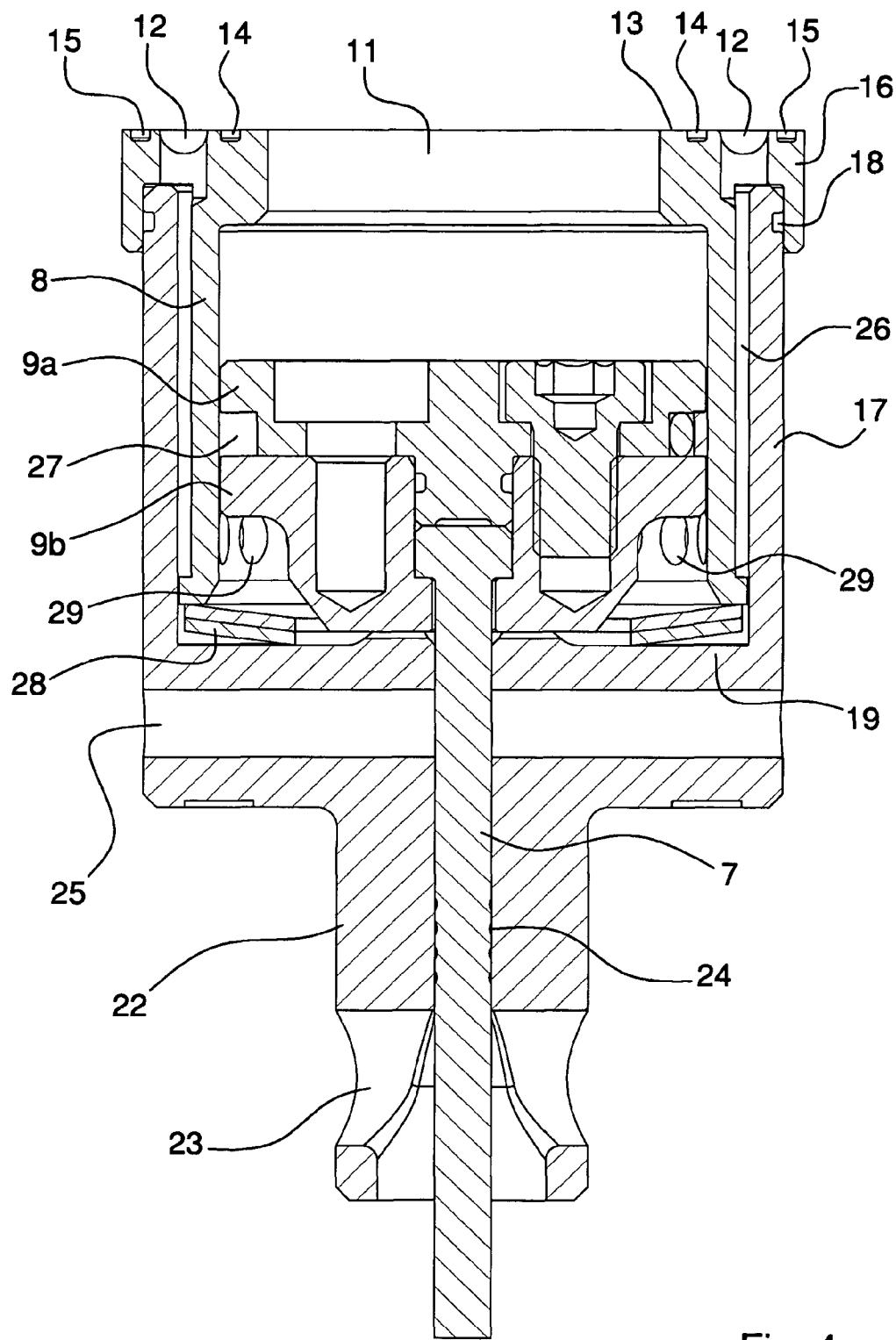
FIG. 4 is a section of a second embodiment of the injection system.

FIG. 4 shows a further embodiment of the injection system, wherein the elements analogous to those of the embodiment of FIGS. 1 to 3 have been indicated with the same numerals. In this embodiment the injection system comprises a deformable body 28 comprising one or more deformable elements (in the specific case, two deformable elements) coupled together. The deformable body 28 may comprise, as in this specific case, a concave-shaped ring disc (for example overturned frustum of cone shaped) or a plurality of concave ring discs coupled together. The deformable body 28 may operate substantially analogously to a Belleville washer. The deformable body 28, as well as the deformable body 20, operates so as to distribute or balance the compression or clamping forces that are applied to the bush 22, in particular during the injection process, or in case of any temperature variation.

The injection system of FIG. 4 is provided with apertures 29 for the passage of the operative fluid (air). The apertures 29 are obtained on a (lower) portion of the piston cylinder 8. The apertures 29 may be arranged in such a manner that the stem-opening port 12 communicates with a side of the piston 9.

The deformable body, in these or in other embodiments, could comprise a body made of a material, or metal alloy, with shape memory (for example a titanium-based shape memory alloy), configured so as to undergo reversible deformations, as a function of tensional and/or thermal status, in particular so as to recover a certain (presettable) shape through the effect of a variation of the temperature and/or of the applied stress state. The deformable body can in particular be configured so as to undergo a set deformation at the temperature envisaged during the step of injecting plastics in order for the desired compressing load to be assured and thus the clamping force to be transmitted that assures fluid-tightness thereof.

The deformable body enables the forces that operate to the bush 22 to be balanced. A part of the forces transmitted by the manifold plate 2 will be absorbed by the deformable body through the effect of its deformability, whilst a part will be discharged onto the back plate 10.

The piston 9 can be made in at least two parts, as in the specific example, in which a first part 9a is coupled with a second part 9b in a removable manner. Between the two parts 9a and 9b it is possible to arrange an (annular) seal 27 having an annular peripheral seal zone. The first part 9a will have an annular seat for housing the seal 27, in which the annular seat can have a seal inserting side that is open in one axial direction (where axial is defined with reference to the axial sliding of the piston), and in which the second part 9b is shaped and arranged so as to close (in an axial direction) the inserting side. The seal 27 can thus be inserted into the seat on the first part 9a (and then be locked in position after coupling of the second part 9b) in a simple and rapid manner and without substantially undergoing stress (in particular stretching) that could damage the seal 27. This contributes to facilitating the mounting, dismantling and replacing of the seal 27, increasing at the same time the operating life thereof. The two parts 9a and 9b can be coupled with one another, for example, with the screw fixing element(s) that also lock the valve stem 7 on the piston 9.

The operation of the injection system 1 is clear from what has been disclosed above. In particular, each operating fluid actuator will actuate the corresponding valve stem 7 to open and close the corresponding injection nozzle 3. Each piston cylinder 8, each bush 22 and each nozzle 3 will be subjected to a compressing load between the back plate 10 and the manifold plate 2, so that leaks of both the operating fluid of the actuator and of the plastics to be injected can be avoided.

It is in particular noted that owing to the possibility of axial sliding between the piston cylinder 8 and the second skirt wall 17 (locked on the manifold 5, in particular by means of the bush 22 as in the illustrated example), the piston cylinder can always be in contact—with a compressing load value within an appropriate range of values—to the back plate 10, at the first seal zone 14 and/or the second seal zone 15, in any operating condition of the injection system 1 (in particular at any temperature). Substantially, the aforesaid axial sliding permits compensation of possible deformation, clearance, loosening or other similar phenomena that could modify in an undesired manner the compressing load transmitted, in particular between the back plate and the manifold. Such phenomena, as known, could occur because of heat expansion of parts of the injection system (expansion due in particular to the presence of melted plastics maintained at a high temperature).

In the above illustrated embodiments or in other embodiments, the operating fluid (e.g. air) for actuating the valve stem 9 may be thermoregulated, particularly in order to improve the cooling of the system.

The invention claimed is:

1. Injection system comprising:
    a manifold plate having at least one nozzle configured for injecting a flow of molten material in a mould cavity;
    a hot runner manifold configured for supplying said nozzle with the flow of molten material, wherein said nozzle is compressed between said manifold and said manifold plate;
    a valve stem for controlling the flow of molten material through said nozzle, wherein at least one part of said valve stem passes through said manifold;
    an actuator having a piston cylinder and a piston that is slidable in a sealed manner within said piston cylinder to open and close said valve stem; and
    a back plate, wherein said piston cylinder is compressed between said back plate and said manifold, whereby a compression load is transmitted between said back plate and said manifold through said piston cylinder so as to close at least one seal zone for an operating fluid of said actuator;
    wherein said injection system comprises a first skirt wall connected to said piston cylinder and a second skirt wall connected to said manifold, said first and second skirt walls being coupled together to allow mutual axial sliding movement of said skirt walls along an annular seal zone in a direction parallel to said valve stem.

2. An injection system according to claim 1, comprising a bottom wall that closes an end of said second skirt wall, said bottom wall having a hole for the passage of said valve stem, and a deformable body arranged between said piston cylinder and said bottom wall.

3. An injection system according to claim 2, wherein said deformable body comprises one or more elastically deformable annular bodies arranged inside a chamber of said actuator.

4. An injection system according to claim 3, wherein a plurality of openings for the passage of the operating fluid of said actuator are obtained in said deformable body and/or in said piston cylinder.

5. An injection system according to claim 2, wherein said bottom wall and said second skirt wall are integrated in a bush housed in a seat obtained in said manifold, said bush having an internal passage for molten material, said valve stem passing through a hole of said bush and being coupled in a sealed manner with a surface of said hole.

6. An injection system according to claim 5, wherein said bush has an internal discharge channel that is transverse to said valve stem and crosses said hole in an intersection zone, said intersection zone being interposed between said passage for molten material and said bottom wall.

7. An injection system according to claim 1, wherein said actuator comprises a dual-effect linear actuator having two supply ports for the operating fluid, a stem-opening port and a stem-closing port, wherein said piston cylinder has a front surface that defines, in collaboration with said back plate, a first seal zone that separates from one another said two supply ports, and a second seal zone that separates the stem-opening port from the exterior and wherein at least one part of said second skirt wall surrounds at least one part of said piston cylinder forming an annular gap that is in fluid communication with the stem-opening port.

8. An injection system according to claim 7, wherein said first and second seal zones are respectively provided with a first and a second seal, each of which is interposed between said front surface and said back plate.

9. An injection system according to claim 1, wherein at least one part of said second skirt wall, and/or at least one part of said first skirt wall, surrounds at least one part of said piston cylinder forming an annular gap that is in fluid communication with an operating side of said piston.

10. An injection system according to claim 9, wherein a deformable body is arranged between said piston cylinder and said manifold for promoting the coupling between said piston cylinder and said back plate and the transmission of the compressing load, said deformable body being interposed between said annular gap and said operating side.

11. An injection system according to claim 1, wherein said first skirt wall has an internal cylindrical surface that is slidably coupled in a fluid-tight manner with an external cylindrical surface of said second skirt wall.

12. An injection system according to claim 1, wherein said piston has a first part and a second part that are coupled together in a removable manner and between which there is arranged an annular seal having one annular peripheral seal zone, said first part having an annular seat for housing said seal, said annular seat having a seal inserting side, said inserting side being open in a direction that is axial with reference to axial sliding movement of the piston, said second part closing said inserting side.

13. An injection system according to claim 1, and further comprising a deformable body at least in part made from a shape memory material, said deformable body being arranged between said piston cylinder and said back plate for promoting the coupling between said piston cylinder and said back plate and the transmission of the compressing load.

\* \* \* \* \*